US 6,424,970 B1

(12) United States Patent
Arakawa et al.

(10) Patent No.: US 6,424,970 B1
(45) Date of Patent: Jul. 23, 2002

(54) SORTING SYSTEM AND METHOD EXECUTED BY PLURAL COMPUTERS FOR SORTING AND DISTRIBUTING DATA TO SELECTED OUTPUT NODES

(75) Inventors: Hiroshi Arakawa, Yokohama; Akira Yamamoto, Sagamihara; Shigeo Honma, Odawara; Hideo Ohata, Fujisawa, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/366,320

(22) Filed: Aug. 2, 1999

(30) Foreign Application Priority Data

Aug. 3, 1998 (JP) .......................... 10-219253

(51) Int. Cl.[7] ................................ G06F 7/16
(52) U.S. Cl. ........................................ 707/7
(58) Field of Search ............................. 707/7

(56) References Cited

U.S. PATENT DOCUMENTS

| | | | | |
|---|---|---|---|---|
| 5,084,815 A | * | 1/1992 | Mazzario ..................... | 707/7 |
| 5,410,689 A | * | 4/1995 | Togo et al. .................. | 707/7 |
| 5,621,908 A | * | 4/1997 | Akaboshi et al. ........... | 707/7 |
| 5,640,554 A | * | 6/1997 | Take ............................ | 707/7 |
| 5,671,405 A | | 9/1997 | Wu et al. .................... | 707/7 |
| 5,794,240 A | * | 8/1998 | Yamashita .................. | 707/7 |
| 5,852,826 A | * | 12/1998 | Graunke ...................... | 707/7 |

FOREIGN PATENT DOCUMENTS

JP    8-272545    10/1996

OTHER PUBLICATIONS

M. Beck et al, "Design and Evaluation of a Parallel Sort Utility", Proceedings of the International Conference on Parallel Processing, Aug. 19, 1986, pp. 934–941.
S. G. Akl et al, "Optimal Parallel Merging and Sorting without Memory Conflicts", IEEE Transactions on Computers, vol. C–36, Nov. 1, 1987, pp. 1367–1369.
Kim et al. "Performance analysis and experiment of sorts on a parallel computer with parallel computation models", Parallel and distributed system, 1997 pp. 154–159.*

* cited by examiner

*Primary Examiner*—John Breene
*Assistant Examiner*—Khanh Pham
(74) *Attorney, Agent, or Firm*—Mattingly, Stanger & Malur, P.C.

(57) ABSTRACT

A sorting system includes a plurality of input nodes, each of which sorts sorting target data distributed and stored in input local disks. An internally sorted result is stored as a plurality of sorted strings in a shared disk connected between the input node and output node. Upon reception of a merge instruction from all input nodes, the output node reads the sorted string from the shared disk and merges it and outputs a whole sorted result of all input data to an output local disk. In a process of obtaining a whole sorted result of all input data through parallel processing by a computer system constituted of a plurality of computers (nodes), a time to sorting input data can be shortened.

4 Claims, 14 Drawing Sheets

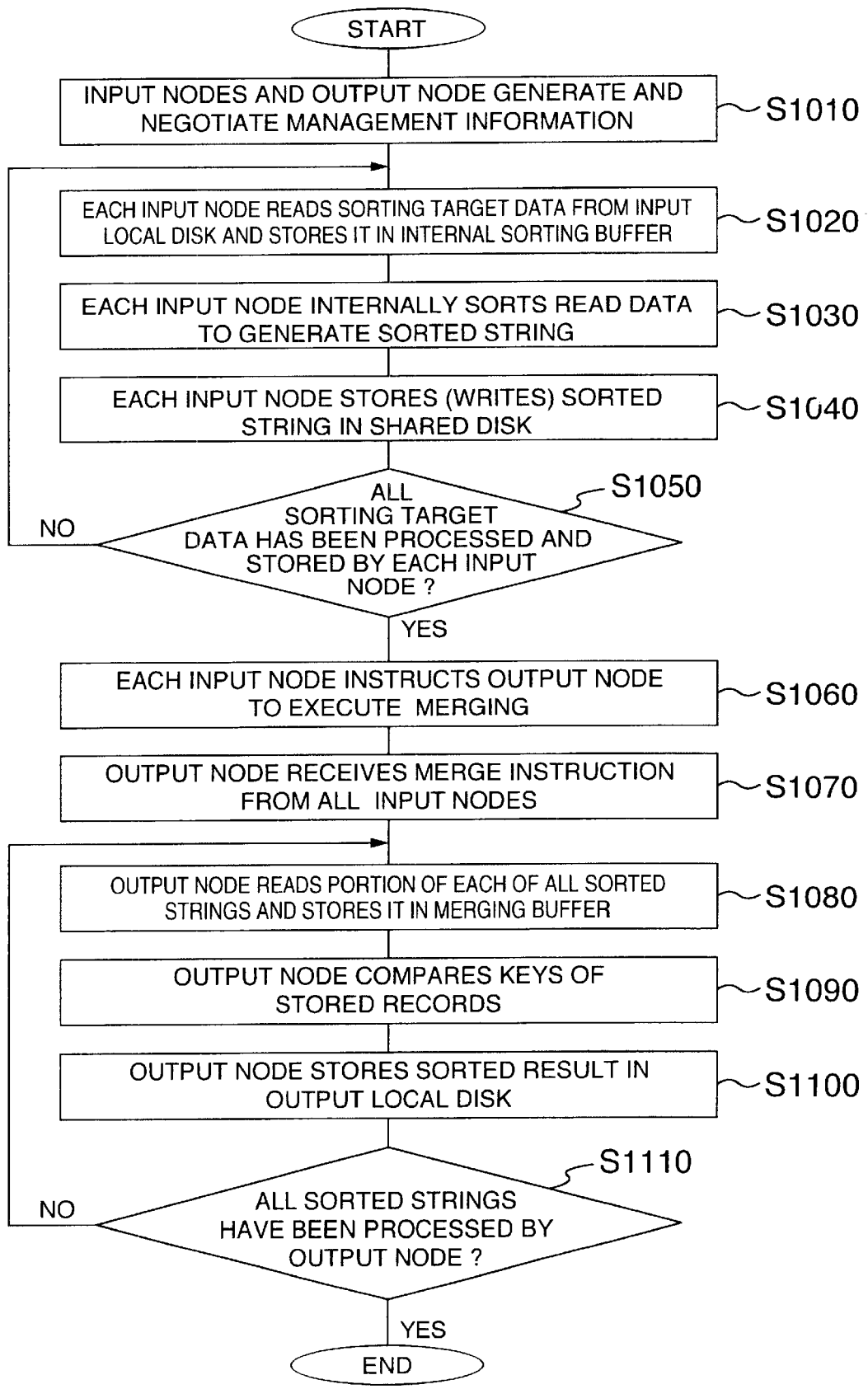

FIG.3

| NODE NAME | ITEM | CONTENTS |
|---|---|---|
| INPUT NODE #1 | NETWORK NUMBER | N1 |
| | SHARED DISK NUMBER FOR CONNECTION TO OUTPUT NODE | D1 |
| | INPUT LOCAL DISK NUMBER | D4 |
| | SORTING TARGET DATA FILE NAME | AAA |
| | RECORD NAME | XXX |
| INPUT NODE #2 | NETWORK NUMBER | N2 |
| | SHARED DISK NUMBER FOR CONNECTION TO OUTPUT NODE | D2 |
| | INPUT LOCAL DISK NUMBER | D5 |
| | SORTING TARGET DATA FILE NAME | BBB |
| | RECORD NAME | XXX |
| INPUT NODE #3 | NETWORK NUMBER | N3 |
| | SHARED DISK NUMBER FOR CONNECTION TO OUTPUT NODE | D3 |
| | INPUT LOCAL DISK NUMBER | D6 |
| | SORTING TARGET DATA FILE NAME | CCC |
| | RECORD NAME | XXX |
| OUTPUT NODE | NETWORK NUMBER | N4 |
| | SHARED DISK NUMBER FOR CONNECTION TO INPUT NODE #1 | D1 |
| | SHARED DISK NUMBER FOR CONNECTION TO INPUT NODE #2 | D2 |
| | SHARED DISK NUMBER FOR CONNECTION TO INPUT NODE #3 | D3 |
| | OUTPUT LOCAL DISK NUMBER | D7 |

FIG.4

| RECORD NAME | ITEM | | CONTENTS |
|---|---|---|---|
| XXX | RECORD SIZE | | 60 |
| | RECORD ITEM NUMBER | | 5 |
| | ITEM #1 | ITEM SIZE | 16 |
| | | ITEM TYPE | CHARACTER STRING |
| | | USE AS KEY | USE |
| | | KEY PRIORITY ORDER | 2 |
| | ITEM #2 | ITEM SIZE | 32 |
| | | ITEM TYPE | CHARACTER STRING |
| | | USE AS KEY | USE |
| | | KEY PRIORITY ORDER | 1 |
| | ITEM #3 | ITEM SIZE | 4 |
| | | ITEM TYPE | INTEGER |
| | | USE AS KEY | USE |
| | | KEY PRIORITY ORDER | 3 |
| | ITEM #4 | ITEM SIZE | 4 |
| | | ITEM TYPE | INTEGER |
| | | USE AS KEY | NOT USE |
| | | KEY PRIORITY ORDER | — |
| | ITEM #5 | ITEM SIZE | 4 |
| | | ITEM TYPE | INTEGER |
| | | USE AS KEY | NOT USE |
| | | KEY PRIORITY ORDER | — |

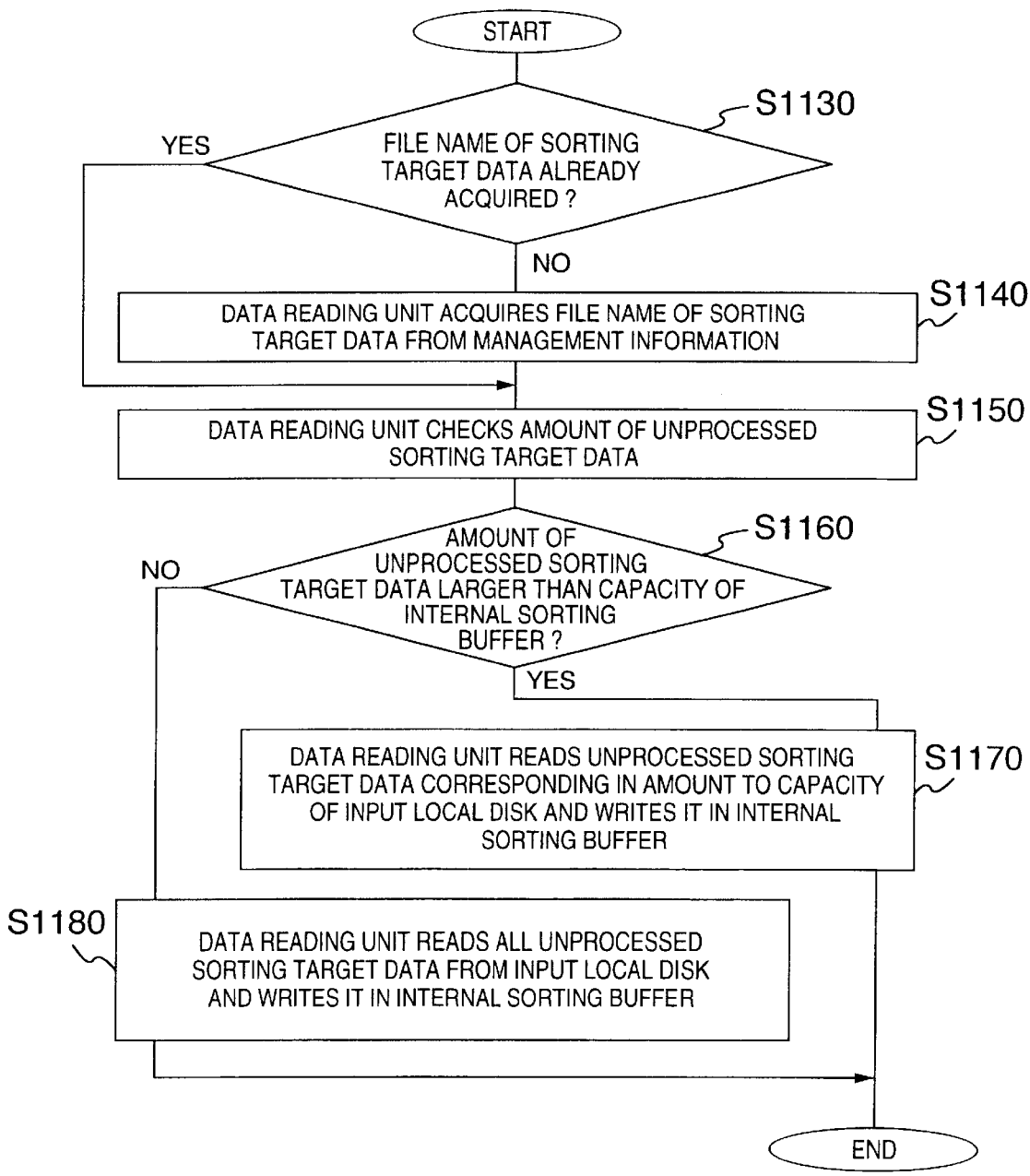

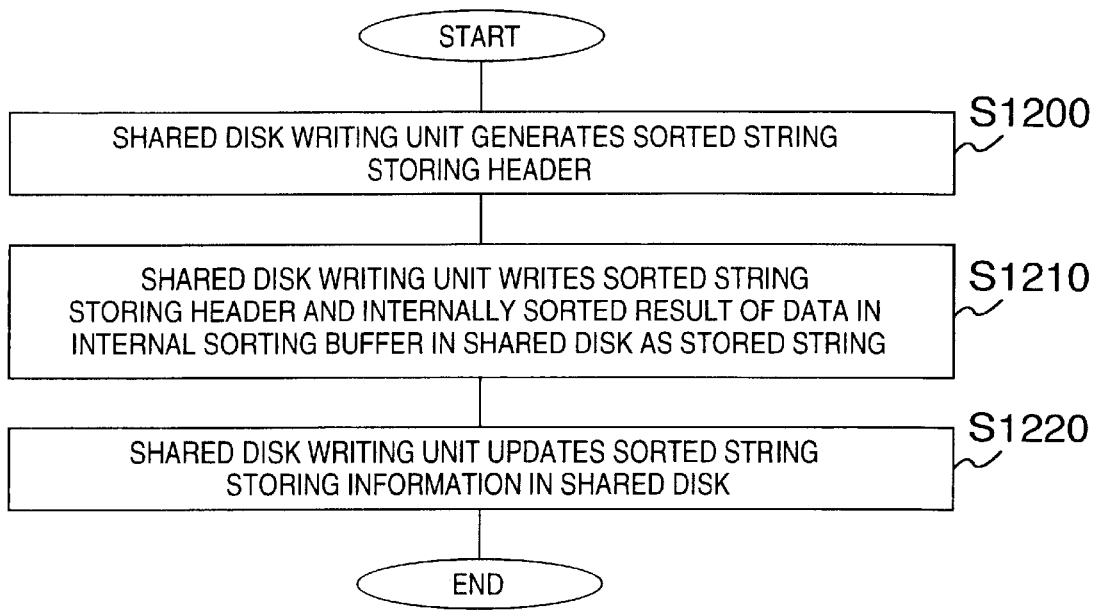

FIG.12

| NODE NAME | ITEM | CONTENTS |
|---|---|---|
| INPUT NODE #1 | NETWORK NUMBER | N1 |
| | SHARED DISK NUMBER FOR CONNECTION TO OUTPUT NODE #1 | D1 |
| | SHARED DISK NUMBER FOR CONNECTION TO OUTPUT NODE #2 | D2 |
| | SHARED DISK NUMBER FOR CONNECTION TO OUTPUT NODE #3 | D3 |
| | INPUT LOCAL DISK NUMBER | D7 |
| | SORTING TARGET DATA FILE NAME | AAA |
| | RECORD NAME | XXX |
| ⋮ | ⋮ | ⋮ |
| OUTPUT NODE #3 | NETWORK NUMBER | N6 |
| | SHARED DISK NUMBER FOR CONNECTION TO INPUT NODE #1 | D3 |
| | SHARED DISK NUMBER FOR CONNECTION TO INPUT NODE #2 | D6 |
| | SHARED DISK NUMBER FOR CONNECTION TO INPUT NODE #3 | D9 |
| | OUTPUT LOCAL DISK NUMBER | D15 |

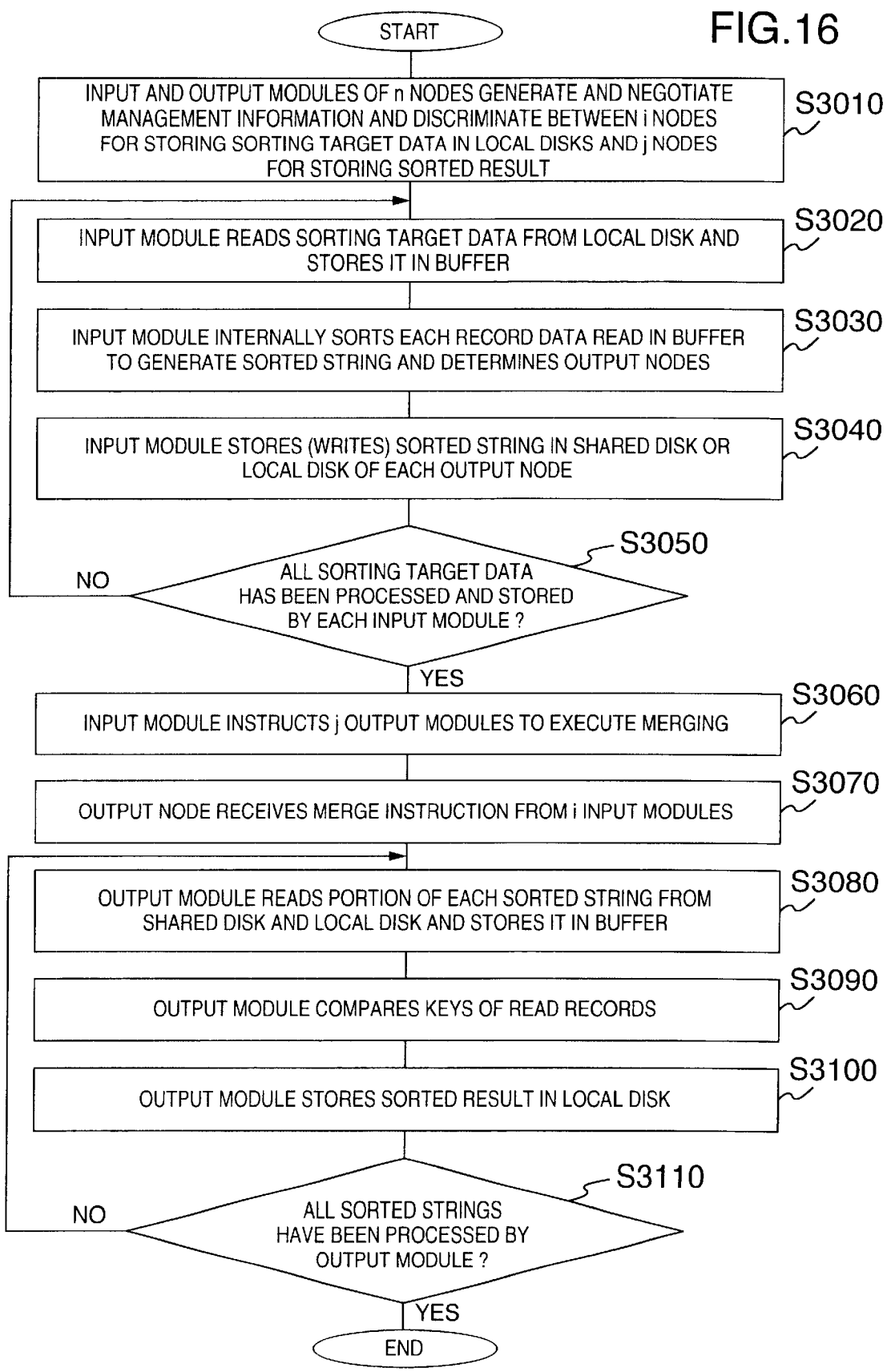

FIG.17

| NODE NAME | ITEM | | CONTENTS |
|---|---|---|---|
| NODE #1 | NETWORK NUMBER | | N1 |
| | SHARED DISK CONNECTED TO NODE #2 | NUMBER | D1 |
| | | TO ANOTHER NODE | REGION A |
| | | FROM ANOTHER NODE | REGION B |
| | SHARED DISK CONNECTED TO NODE #3 | NUMBER | D2 |
| | | TO ANOTHER NODE | REGION A |
| | | FROM ANOTHER NODE | REGION B |
| | SHARED DISK CONNECTED TO NODE #4 | NUMBER | D3 |
| | | TO ANOTHER NODE | REGION A |
| | | FROM ANOTHER NODE | REGION B |
| | SHARED DISK CONNECTED TO NODE #5 | NUMBER | D4 |
| | | TO ANOTHER NODE | REGION A |
| | | FROM ANOTHER NODE | REGION B |
| | LOCAL DISK | NUMBER | D4 |
| | | TO ITS NODE | SELF-NODE STORAGE REGION |
| | | FROM ITS NODE | SELF-NODE STORAGE REGION |
| | SORTING TARGET DATA | PRESENCE /ABSENCE | PRESENCE |
| | | STORAGE REGION | SORTING TARGET DATA STORAGE REGION |
| | | FILE NAME | AAA |
| | | RECORD NAME | XXX |
| | POSSIBILITY OF STORING SORTED RESULT | PRESENCE /ABSENCE | PRESENCE |
| | | STORAGE REGION | SORTED RESULT STORAGE REGION |
| | ⋮ | ⋮ | ⋮ |

SORTING SYSTEM AND METHOD EXECUTED BY PLURAL COMPUTERS FOR SORTING AND DISTRIBUTING DATA TO SELECTED OUTPUT NODES

BACKGROUND OF THE INVENTION

1. Field of the Invention

The present invention relates to a sorting process to be executed by a computer system, and more particularly to a sorting process to be executed by a plurality of computers.

2. Description of the Related Art

A sorting process is one of fundamental types of information processing to be executed by a computer system. A most common sorting process is to rearrange a plurality of records each including one or a plurality of keys, in a certain order (e.g., ascending or descending order) in accordance with the keys.

In a sorting process for a relatively small amount of input data (collection of records), a computer writes given input data in a buffer of a computer memory, refers to and compares keys of respective records to rearrange the records and obtain a sorted result. Such a sorting process which uses only the buffer of a computer memory as data storage region is called internal sorting.

In another sorting process for a relatively large amount of input data as compared to the capacity of a buffer, since all the input data cannot be written in the buffer, the computer divides the input data and writes each division data into the buffer to perform internal sorting and obtain the sorted result (hereinafter called a sorted string) which is stored in an external storage. Such input data write, internal sorting and sorted string storage are repeated as many times as the number of input data divisions. As a result, sorted strings corresponding in number to the number of data divisions are stored in the external storage.

Next, the computer reads each portion of all the sorted strings from the external storage and writes the portions in the buffer. The computer compares the keys of the records stored in the buffer to obtain a sorted result of each portion of all the sorted strings. Such a process for each portion of all the sorted strings is executed from the start to end of each sorted string to thereby obtain a final sorted result of all the input data. Such a process of obtaining the final sorted result from each sorted result is called merging. Such a sorting process using the computer buffer and external storage as data storage region is called external sorting. The external storage may be a magnetic disk, a magnetic tape or the like.

Parallel processing is one type of high speed information processing to be executed by a computer system. Parallel processing shortens a process time by preparing a plurality of resources necessary for information processing and performing a plurality of tasks at the same time, thereby attempting to reduce the processing time. As an example of a parallelized external sorting process, JP-A-8-272545 discloses techniques of improving parallel processing by using a disk array constituted of a plurality of magnetic disks as an external storage and devising the storage locations of data in the disk array.

In another type of a parallelized external sorting process, a plurality of computers may be interconnected by a network to constitute one computer system and a large amount of input data may be sorted in parallel by a plurality of computers. More specifically, input data is distributed and assigned to some or all computers (hereinafter called input nodes) among a plurality of computers, and each input node externally sorts the assigned input data. The externally sorted result at each input node is transferred via the network to one computer (hereinafter called an output node) among a plurality of computers. The output node merges the sorted results transferred from the input nodes in a manner similar to dealing with externally sorted strings, to thereby obtain the final sorted result of all the input data.

However, while the sorting process is executed in parallel by a computer system constituted of a plurality of computers, the merging process is required to be executed both at the input nodes and output node. Therefore, a time required for the merging process at an input node is added to a time required for the sorting process at the input node. The merging process at an input node may delay or hinder another task at the input node.

If a network interconnecting computers cannot operate at high speed, a time to transfer, via such a network, the externally sorted result at an input node to the output node may pose some problem. For example, if a network is a LAN having a transfer speed of 100 M bits/sec such as 100 Base-T, the data transfer speed is about 12.5 M bytes/sec or lower. It takes therefore about a threefold transfer time, as compared to about 40 M bytes/sec or lower of an ultra wide SCSI which is commonly used I/O specifications. If a plurality of computers are interconnected by a network operating at not so high a speed, a ratio of the data transfer time to the sorting process time may become large.

SUMMARY OF THE INVENTION

It is an object of the present invention to provide a sorting system and method capable of executing parallel sorting processes at a plurality of computers in high speed by shortening the sorting process time.

A first sorting system of this invention comprises: a plurality of input nodes; one output node; and a shared external storage unit connected between each of the input units and the output unit. Each of the input units comprises: a first buffer; means for storing sorting target data in the first/buffer; means for internally sorting data in the first buffer in accordance with a predetermined sorting rule; and means for storing as a sorted string an internally sorted result in the shared external storage unit. The output node comprises: a second buffer; means for storing, in the second buffer, the sorted string stored in the shared external storage unit; means for merging a plurality of sorted strings stored in the second buffer in accordance with the predetermined sorting rule; and means for outputting a merged result as a sorted result.

A second sorting system of the invention comprises: a plurality of input nodes; a plurality of output nodes; and a shared external storage unit connected between each of the input units and each of the output units. Each of the input units comprises: a first buffer; means for storing sorting target data in the first buffer; means for internally sorting data in the first buffer in accordance with a predetermined sorting rule; means for classifying data in the first buffer in accordance with a predetermined classification rule; and means for storing as a sorted string an internally sorted result in the shared external storage unit in accordance with the predetermined classification rule. The output node comprises: a second buffer; means for storing, in the second buffer, the sorted string stored in the shared external storage unit; means for merging a plurality of sorted strings stored in the second buffer in accordance with the predetermined sorting rule; and means for outputting a merged result as a sorted result.

In the first and second sorting systems, the input node may further comprise means for notifying a merge instruction to the output node, and the output node may further comprise means for receiving the merge instruction.

A third sorting system of the invention comprises: a plurality of nodes; a dedicated external storage unit provided for each of the plurality of nodes; and a shared external storage unit provided between each pair of nodes of the plurality of nodes. At least one node among the plurality of nodes comprises: a first buffer; means for storing sorting target data in the first buffer; means for internally sorting data in the first buffer in accordance with a predetermined sorting rule; means for sorting as a sorted string an internally sorted result in the dedicated external storage unit; a second buffer; means for storing, in the second buffer, the sorted string stored in the shared external storage unit and the dedicated external storage unit; means for merging a plurality of sorted strings stored in the second buffer in accordance with the predetermined sorting rule; and means for outputting a merged result as a sorted result.

A fourth sorting system of the invention comprises: a plurality of nodes; a dedicated external storage unit provided for each of the plurality of nodes; and a shared external storage unit provided between each pair of nodes of the plurality of nodes. At least one node among the plurality of nodes comprises: a first buffer; means for storing sorting target data in the first buffer; means for internally sorting data in the first buffer in accordance with a predetermined sorting rule; means for classifying data in the first buffer in accordance with a predetermined classification rule; means for sorting as a sorted string an internally sorted result in the dedicated external storage unit in accordance with the predetermined classification rule; a second buffer, means for storing, in the second buffer, the sorted string stored in the shared external storage unit and the dedicated external storage unit; means for merging a plurality of sorted strings stored in the second buffer in accordance with the predetermined sorting rule; and means for outputting a merged result as a sorted result.

In the third and fourth sorting systems, the first and second buffers may be the same buffer. At least one of the plurality of nodes may further comprise means for notifying another output node of a merge instruction and means for receiving the merge instruction from the other node.

A first sorting method of the invention for a sorting system having a plurality of input nodes, one output node, and a shared external storage unit connected between each of the input units and the output unit, comprises the steps of: storing sorting target data in the input node and internally sorting the sorting target data in accordance with a predetermined sorting rule; storing as a sorted string an internally sorted result in the shared external storage unit; and reading the sorted string from the shared external storage unit, storing the sorted string in the output node, and merging the sorted string in accordance with the predetermined sorting rule.

A second sorting method of the invention for a sorting system having a plurality of input nodes, a plurality of output nodes, and a shared external storage unit connected between each of the input units and each of the output units, comprises the steps of: storing sorting target data in each of the input nodes; classifying and internally sorting the read sorting target data in accordance with a predetermined classification rule and a predetermined sorting rule; distributing and storing a classified and sorted result in the shared external storage units shared with the output nodes in accordance with the predetermined classification rule; performing a process from the storing step to the distributing and storing step for all sorting target data; and thereafter reading the sorted string from the shared external storage units shared with the input nodes and storing the sorted string in each output node, and merging the sorted string in accordance with the predetermined sorting rule.

A third sorting method of the invention for a sorting system having a plurality of nodes, a dedicated external storage unit provided for each of the plurality of nodes, and a shared external storage unit provided between each pair of nodes of the plurality of nodes, comprises the steps of: storing sorting target data in each of the input nodes and internally sorting the sorting target data in accordance with a predetermined sorting rule; storing, as a sorted string, an internally sorted result in the dedicated or shared external storage unit; performing the internal sorting step and the sorted string storing step for all sorting target data; and thereafter reading each sorted string from the dedicated and shared external storage units at one of the plurality of nodes and merging each sorted string in accordance with the predetermined sorting rule.

A fourth sorting method of the invention for a sorting system having a plurality of nodes, a dedicated external storage unit provided for each of the plurality of nodes, and a shared external storage unit provided between each pair of nodes of the plurality of nodes, comprises the steps of: storing sorting target data in at least one of the plurality of nodes; classifying and internally sorting the read sorting target data in accordance with a predetermined classification rule and a predetermined sorting rule; distributing and storing as a sorted string a classified and internally stored result in the dedicated or shared external storage unit in accordance with the classification rule; performing a process from the storing step to the distributing and storing step for all sorting target data; and thereafter reading each sorted string from the dedicated and shared external storage units at one of the plurality of nodes and merging each sorted string in accordance with the predetermined sorting rule.

In the third and fourth sorting methods, at least one node may have the same buffer to be used for storing the sorting storage data and storing the sorted string.

The input node, output node, and other nodes correspond, for example, to general computers. The dedicated and shared external storage units correspond, for example, to a magnetic disk drive. The first and second buffers and other buffers may use, for example, a portion of a main storage of each computer.

BRIEF DESCRIPTION OF THE DRAWINGS

FIG. 2 is a flow chart illustrating the main sorting processes to be executed by the first sorting system.

FIG. 3 shows an example of a system configuration information table of the first sorting system.

FIG. 4 shows an example of a record information table.

FIG. 5 is a flow chart illustrating a process of reading sorting target data.

FIG. 6 is a flow chart illustrating a process of storing a sorted string in a shared disk 500 to be executed by the first sorting system.

FIG. 7 shows an example of a sorted string storing header.

FIG. 8 shows an example of sorted string storing information.

FIG. 12 shows an example of a system configuration information table of the second sorting system.

FIG. 16 is a flow chart illustrating the main sorting processes to be executed by the third sorting system.

FIG. 17 shows an example of a system configuration information table of the third sorting system.

DETAILED DESCRIPTION OF THE EMBODIMENTS

Embodiments of the invention will be described in detail with reference to the accompanying drawings.

(1st Embodiment)

Figure 1:
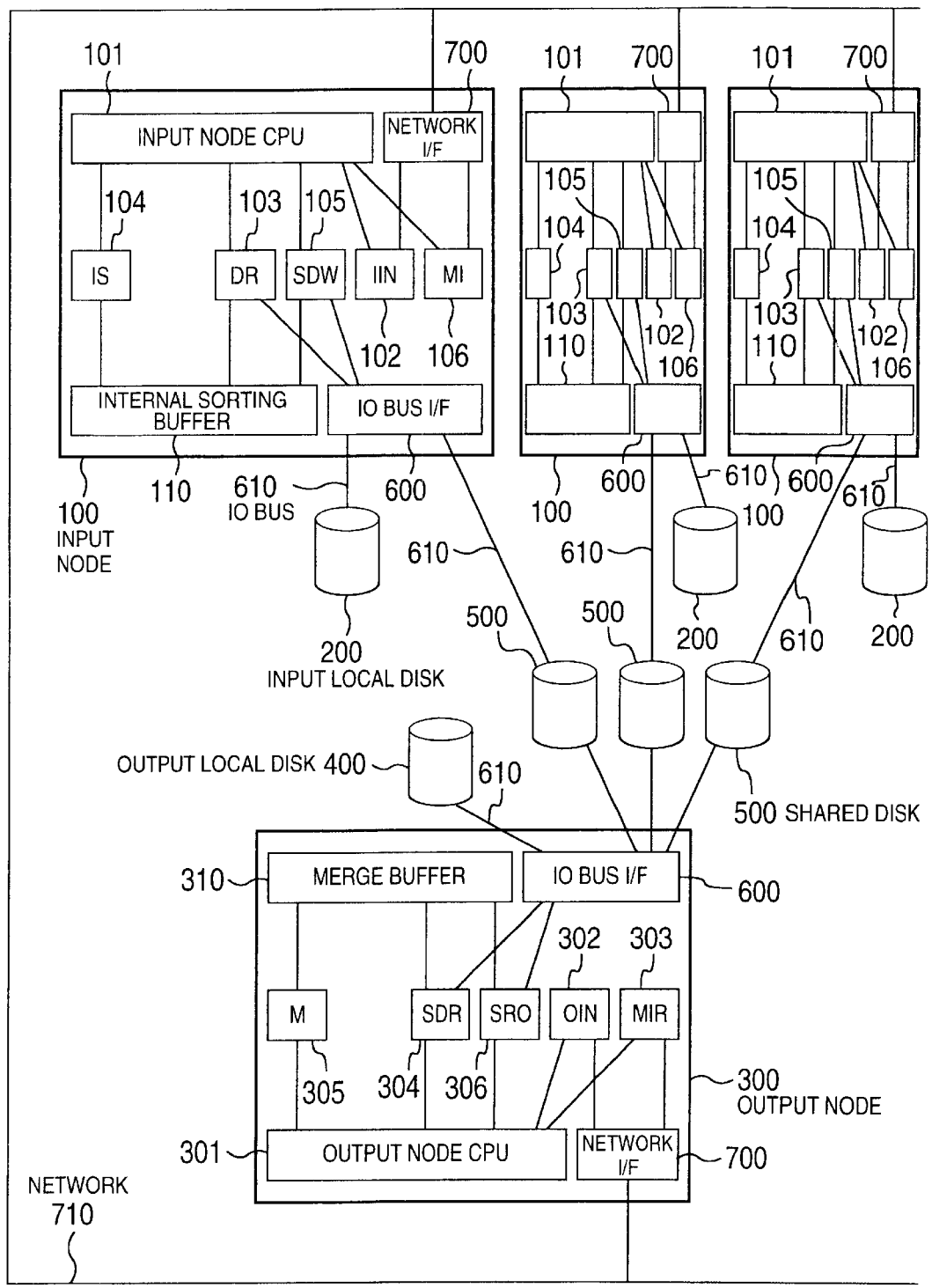
FIG. 1 is a block diagram of a first sorting system of the invention.

FIG. 1 is a block diagram of a first sorting system of the invention. As shown in FIG. 1, this system includes input node 100, input local disks 200, an output node 300, an output local disk 400, and shared disks 500. The input nodes 100 and output node 300 are general computers such as PC and work stations. The input local disks 200, output local disk 400 and shared disks 500 are general external storage devices such as a magnetic disk device.

This system has a plurality of input nodes 100 and a single output node 300. The shared disk 500 is provided between the output node 300 and each input node 100. Namely, there are shared disks same in number as the number of input nodes 100.

The input node 100 has an input node CPU 101, an input information negotiation unit 102, a data reading unit 103, an internal sorting unit 104, a shared disk writing unit 105, a merge instructing unit 106, an internal sorting buffer 110, an IO bus interface (I/F) 600 and a network interface (I/F) 700. The input local disk 200 is connected via an IO bus 610 to the IO bus I/F 600 of the input node 100.

The input information negotiation unit 102, data reading unit 103, internal sorting unit 104, shared disk writing unit 105 and merge instructing unit 106 are realized, for example, by execution of software stored in an unrepresented memory by the input node CPU 101. The internal sorting buffer 110 is realized, for example, by using part of a memory which the input CPU 101 uses for the execution of software, or by preparing a dedicated memory.

The output node 300 has an output node CPU 301, an output information negotiation unit 302, a merge instruction receiving unit 303, a shared disk reading unit 304, a merge unit 305, a sorted result output unit 306, a merge buffer 310, an IO bus I/F 600 and a network I/F 700. The output local disk 400 is connected via an IO bus 610 to the IO bus I/F 600 of the output node 300.

The output information negotiation unit 302, merge instruction receiving unit 303, shared disk reading unit 304, merge unit 305 and sorted result output unit 306 are realized, for example, by execution of software stored in an unrepresented memory by the output node CPU 301. The merge buffer 310 is realized, for example, by using part of a memory which the output CPU 301 uses for the execution of software, or by preparing a dedicated memory.

Each of the plurality of input nodes 100 and the single output node 300 is connected via the network I/F 700 to the network 710. Each of the shared disks 500 is connected via the IO bus 610 to the IO bus I/F 600 of each of the input nodes 100 and output node 300.

In this system, data to be sorted (sorting target data) is divisionally assigned to the plurality of input nodes 100 and stored in the input local node disk 200 of each input node 100. The amount of sorting target data stored in each local disk 200 is herein assumed to be larger than the capacity of the internal sorting buffer 110 of each input mode 100. The sorting target data is a collection of records each including one or a plurality of keys to be used for a sorting process. In this system, the final sorted result is stored in the output local disk 400 of the output disk 300.

Next, the sorting process to be executed by the sorting system will be described.

First, the main sorting processes to be executed by the sorting system will be described, and the details of each process will be later given. FIG. 2 is a flow chart illustrating the main sorting processes to be executed by the sorting system. First, when a user or the like instructs the sorting system to start the sorting process, the input nodes 100 and output node 300 generate and negotiate management information necessary for the sorting process, prior to executing the actual sorting process (S1010).

Next, each input node 100 divides the sorting target data stored in the input local disk 200 and stores the division data in the internal sorting buffer 110 (S1020). The stored data is internally sorted to generate a sorted result (sorted string) (S1030), and the sorted string is stored in the shared disk 500 (S1040). The input node 100 checks whether all the sorting target data assigned to the input node 100 has been processed and stored (S1050). If there is still sorting target data not processed, the input node 100 repeats the above-described Steps S1020 to S1040. If all the sorting target data assigned to the input node 100 has been completely processed, the input node 100 instructs the output node 300 to execute a merging process (S1060).

If the output node 300 receives the merge instruction from all input nodes 100 (S1070), the output node 300 reads a portion of each of a plurality of sorted strings from the shared disk 500 and writes the read portions in the merge buffer 310 (S1080). The output node 300 compares the keys of records stored in the merge buffer 310 to obtain a whole sorted result of the records (S1090), and stores the sorted result in the output local disk 400 (S1100). The output node 300 checks whether all the sorted strings stored in the shared disk 500 have been completely processed (S1110). If there is still sorted strings not processed, the output node 300 repeats the above-described Steps S1080 to S1100. With the above-described processes executed by the input and output nodes 100 and 300, the final sorted result of all the sorting target data divisionally stored in the plurality of input local disks 200 can be obtained.

The details of each process will be given in the following.

First, the management information negotiation process will be described. This process generates and negotiates management information necessary for the sorting process, prior to executing the actual sorting process.

The input information negotiation unit 102 of each input node 100 and the output information negotiation unit 302 of the output node 300 generate, negotiate and store management information necessary for the sorting process, by using information preset by a user or the like and information exchanged between the input and output information negotiation units 102 and 302 via the network 710. The management information necessary for the sorting process includes information stored in a system configuration information table which stores data of the system configuration of the sorting system, information stores in a record information table which stores data of the sorting target records, and other information.

FIG. 3 shows an example of the system configuration table. Referring to FIG. 3, a "node name" is a name assigned to each node. An "item" and "contents" at each node indicate the configuration information at each node to be used for the sorting process. For example, a "network number" in an "input node #1" is an identification number of the input node #1 in the network 710 (in the example shown in FIG. 3, N1). A "shared disk number for connection to output node" is an identification number of a shared disk connected to the output node, among the disks of the input node #1 (in the example shown in FIG. 3, D1). A "input local disk number" is an identification number of the disk for storing the sorting target data, among the disks of the input node #1 (in the example shown in FIG. 3, D4). A "sorting target data file name" is the name of a file of the sorting target data stored in the input local disk (in the example shown in FIG. 3, AAA). A "record name" is the name assigned to the record type of the sorting target data (in the example shown in FIG. 3, XXX). A "shared disk number for connection to input node #1" is an identification number of the disk for the connection to the input node #1, among the disks connected to the input nodes (in the example shown in FIG. 3, D1). An "output local disk number" of the output node is an identification number of the disk for storing the sorted result, among the disks of the output node (in the example shown in FIG. 3, D7).

FIG. 4 shows an example of the record information table. In FIG. 4, a "record name" is a name assigned to a record type. This record name (type) is stored in the item "record name" of the system configuration table shown in FIG. 3.

In this record information table, a "record size" is a size (number of bytes) of a unit record. A "record item number" is the number of items constituting a record unit. An "item size" in each of "item #1" to "item #5" is a size (number of bytes) of each item. An "item type" is a type of data in the item. A "use as key" indicates whether the item is used as the key for rearranging record units in the sorting process, i.e., whether rearrangement is performed in accordance with the contents in the item. A "key priority order" is a priority order of items among a plurality of items to be used for rearrangement which is performed in the higher priority order. The record used in the record information table shown in FIG. 4 is a fixed length record. One record unit has 60 bytes including 16-byte "item #1", 32-byte "item #2", and 4-byte "item #3", "item #4" and "item #5".

After the management information necessary for the sorting process is prepared by the above-described management information negotiation process, a sorting target data reading process is executed. FIG. 5 is a flow chart illustrating the sorting target data reading process. Before the sorting target data reading process starts, the data reading unit 103 of each input node 100 checks whether the file name of the sorting target data is already acquired (S1130). If not, the file name of the sorting target data is acquired from the system configuration information table (S1140).

Next, the amount of unprocessed sorting target data stored in the input local disk 200 is checked (S1150) and it is checked whether the amount of unprocessed data is larger than the capacity of the internal sorting buffer 110 (S1160). If larger, the unprocessed sorting target data corresponding in amount to the capacity of the internal sorting buffer 110 is read from the input local disk 200 and written in the internal sorting buffer 110 (S1170). If the amount of unprocessed data is equal to or smaller than the capacity of the internal sorting buffer 110, all the unprocessed sorting target data is read from the input local disk 200 and written in the internal sorting buffer 110 (S1180).

After the unprocessed sorting target data is written in the internal sorting buffer 110 in the above manner, the internal sorting process is performed for the data stored in the internal sorting buffer 110. The internal sorting means at each input node 100 internally sorts the sorting target data stored in the internal sorting buffer 110 to rearrange records in accordance with one or a plurality of keys contained in the records. The sorted result of the data stored in the internal sorting buffer 110 is therefore obtained. This rearrangement is performed in accordance with a predetermined sorting rule to rearrange the records in a key order such as an ascending or descending order.

After the internal sorting process for the data written in the internal sorting buffer 110 is completed in the above manner, a sorted string storing process is performed to store the internally sorted result of the data in the internal sorting buffer 110, in the shared disk 500 as a sorted string.

FIG. 6 is a flow chart illustrating a process of storing a sorted string in the shared disk. The shared disk writing unit 105 of each input node 100 generates a sorted string storing header (S1200), and writes as a sorted string the header and the internally sorted result of the data in the internal sorting buffer 110 into the shared disk 500 (S1210) to then update the sorted string storing information in the shared disk 500 (S1220).

FIG. 7 is a diagram showing an example of the sorted string storing header. As shown in FIG. 7, the sorted string storing header has fields of "output destination node name", "sorted string storing number", "generation date/time" and "record number". The "output destination node name" is the name of the output node 300 connected to the shared disk 500. The "sorted string storing number" is a serial number sequentially assigned to each sorted string when the sorted string is generated and written. The "generation data/time" is the date and time when each sorted string is generated. The "record number" is the number of records contained in each sorted string.

FIG. 8 is a diagram showing an example of sorted string storing information. This sorted string storing information is information on the sorted strings written in the shared disk 500, and is provided for each shared disk 500. As shown in FIG. 8, the sorted string storing information includes an "output destination node name", an "update date/time" and a "sorted string storing number". The "output destination node name" is the name of the output node 300 connected to the shared disk 500 which stores the sorted string storing information. The "update date/time" is the date and time when the sorted string storing information is updated when a sorted string is written. The "sorted string storing number" is the number of sorted strings stored in the shared disk 500 for the output destination node.

The above-described processes from reading sorting target data to storing a sorted string in the shared disk are repeated by each input node 100 until all the sorting target data stored in the input local disk is completely processed. After each input node 100 completely processes all the sorting target data stored in the input local disk and stores the sorted strings in the shared disk 500, the merge instructing unit 106 of the input node 100 instructs the output node 300 to execute the merging process.

Figure 9:
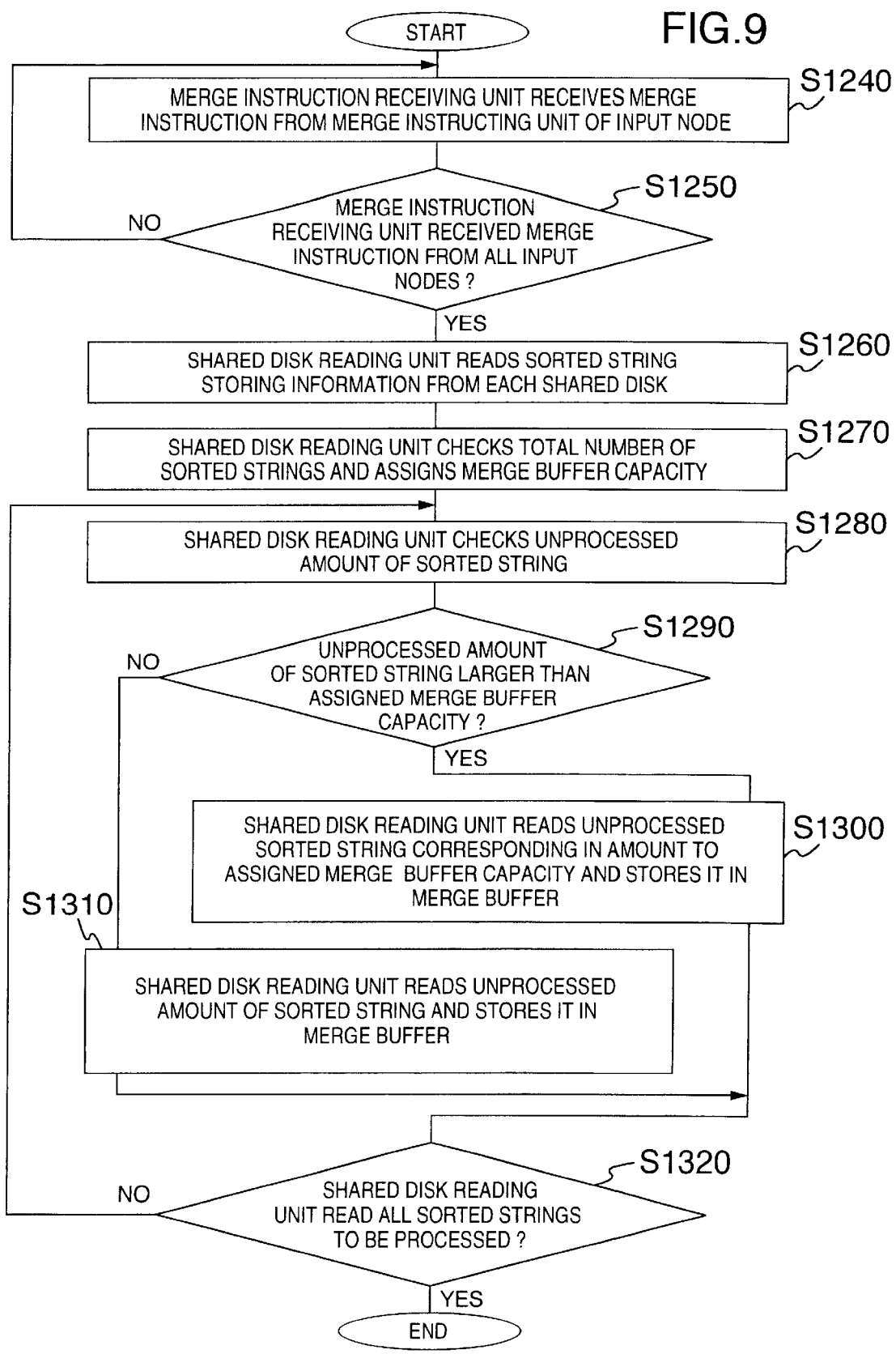
FIG. 9 is a flow chart illustrating a process of reading a sorted result to be executed by the first sorting system.

Next, a sorted string reading process will be described, which is executed when the output node 300 receives the merge instruction from all the input nodes 100. FIG. 9 is a flow chart illustrating a process of reading a sorted string from the shared disk 500. When the merge instruction receiving unit 303 of the output node 300 receives a merge instruction from the input node 100 via the network 710 (S1240), it checks whether the merge instruction has been received from all the input nodes (S1250). If there is an input node from which the merge instruction is still not received, the merge instruction receiving unit 303 stands by until the merge instruction is received from all the input nodes. When the merge instruction is received from all the input nodes 100, the shared disk reading unit 304 reads the sorted string storing information in each shared disk 500 connected to the output node 300 (S1260) to check the total number of sorted strings stored in all the shared disks 500. A quotient is calculated by dividing the capacity of the merge buffer 310 by the total number of sorted strings. This quotient is used as the capacity of the merge buffer 310 to be assigned to each sorted string (S1270).

After the capacity of the merge buffer to be assigned to each sorted string determined, the shared disk reading unit 304 selects one of sorted strings to be processed, and refers to the sorted string storing header of the selected sorted string to check the size of the sorted string. This size is set as an initial value of the unprocessed amount of the sorted string. It is then checked whether the unprocessed amount of the sorted string is larger than the assigned buffer capacity (S1290). If the unprocessed amount of the sorted string is larger than the assigned buffer capacity, the unprocessed sorted string corresponding in amount to the assigned buffer capacity is read from the shared disk 500 and written in the merge buffer 310 (S1300). If the unprocessed amount of the sorted string is equal to or smaller than the assigned buffer capacity, all the unprocessed sorted string is read from the shared disk 500 and written in the merge buffer 310 (S1310). Reading the unprocessed sorted string is performed starting from the top of the sorted string to the last in the sorted order. The read unprocessed portion of the sorted string is called a sorted segment which constitutes the unprocessed sorted string.

After the sorted segment of one sorted string is stored in the merge buffer 310, it is checked whether the sorted segments of all the sorted strings to be processed have been read (S1320). If there is a sorted string whose segment is still not read, the above-described Steps S1280 to S1310 are repeated. In this manner, the sorted segments of the sorted strings stored in all the shared disks 500 are read and written in the merge buffer 310.

Figure 10:
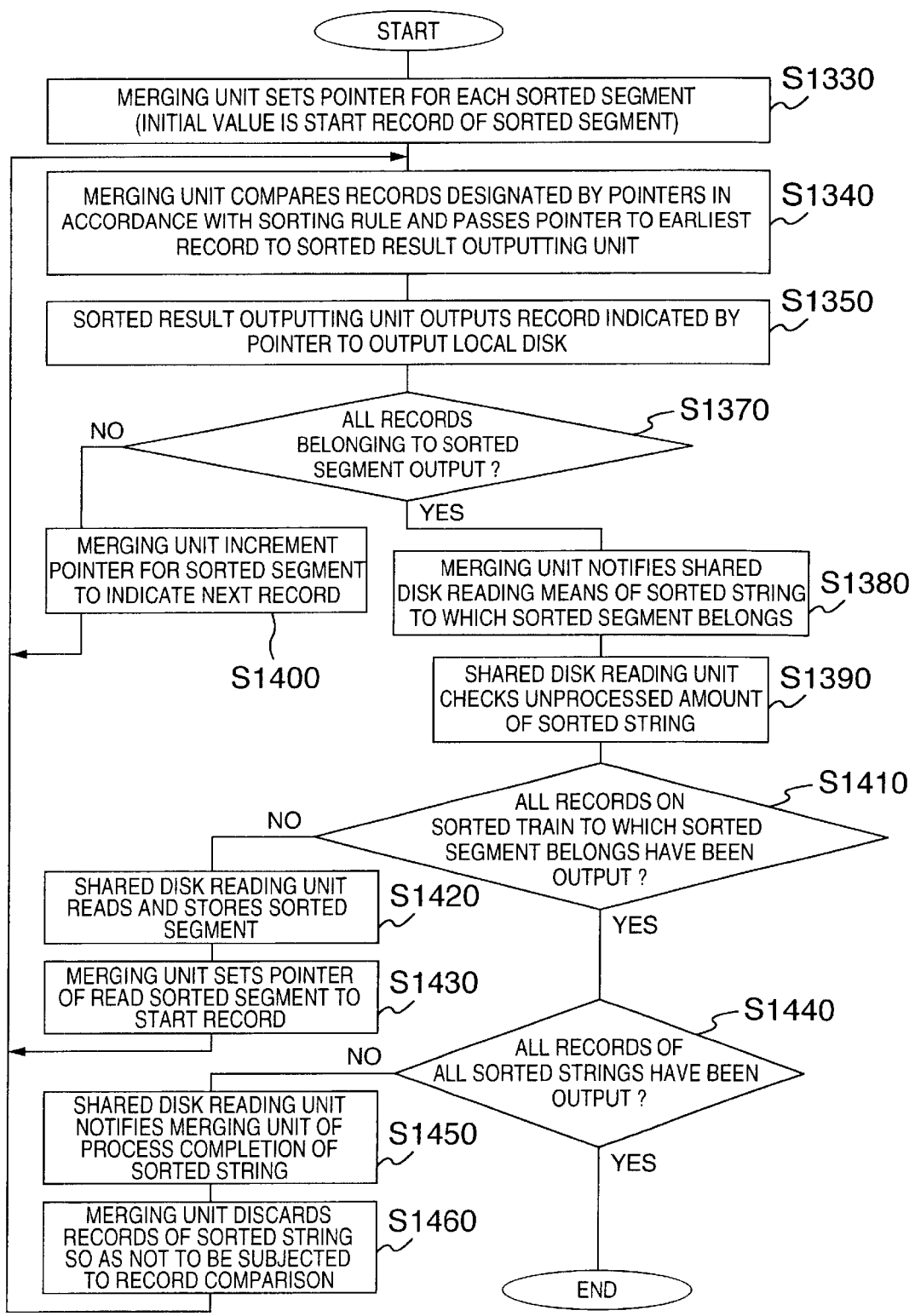
FIG. 10 is a flow chart illustrating a process of merging and outputting a sorted result to be executed by the first sorting system.

After the sorted segments are completely written in the merge buffer 310 in the above manner, a merging process and a final sorted result outputting process are performed for the data stored in the merge buffer 310. FIG. 10 is a flow chart illustrating the merging/sorted result outputting process. The merging unit 305 of the output node 300 first sets a pointer to a record in the sorted segment of each sorted string stored in the merge buffer 310 (S1330). The initial value of the pointer immediately after each sorted segment is read is assumed to be the start record of the sorted segment.

Next, the merging unit 305 compares the keys of records designated by pointers of all the sorted segments in the merge buffer 310 in accordance with a predetermined sorting rule, and passes the pointer to the record at the earliest position in accordance with the predetermined sorting rule, to the sorted result outputting unit 306 (S1340). The sorted result outputting unit 306 writes the record corresponding to the received pointer in the output local disk 400 (S1350). The merging unit 305 checks whether all other records of the sorted segment stored in the merge buffer 310 have been output (S1370). If a record of the sorted segment to be compared is still stored in the merge buffer 310, the pointer for the sorted string is incremented by "1" to indicate the next record (S1400), to thereafter repeat the above-described Steps S1340 and S1350. In this manner, the merging unit 305 and sorted result outputting unit 306 output the sorted results of the sorted segments stored in the merge buffer 310, to the output local disk 400.

If the merging unit 305 and sorted result outputting unit 306 output all the records contained in one sorted segment stored in the merge buffer 310 (S1370: Y), then the merging unit 305 notifies the shared disk reading unit 304 of the sorted string to which the sorted segment belongs (S1380).

Upon reception of this notice, the shared disk reading unit 304 checks the unprocessed amount of the sorted string (S1390) to check whether there is any unprocessed sorted segment in the sorted string (S1410). If there is an unprocessed sorted segment, this segment is read from the shared disk 500 (S1420) and overwritten on the already output sorted segment in the merge buffer 310 (S1420). The merging unit 305 initializes the pointer for the newly stored sorted segment to indicate the start record in the stored sorted segment (S1430). The merging means and sorted result outputting unit 306 repeat the above-described Steps S1340 to S1390. The unprocessed amount of the sorted string is properly updated when the sorted segment is read from the shared disk 500 and stored in the merge buffer 310.

If there is no unprocessed sorted segment in the sorted string (S1410: Y), then it is checked whether all the sorted strings stored in a plurality of shared disks 500 have been processed (S1440). It there is a sorted string still not processed, the shared disk reading unit 304 notifies the merging unit 305 of the process completion of the sorted string (S1450) so that the merging unit 305 discards the sorted segments of the sorted string so as not to be subjected to the record comparison (S1460) to thereafter repeat the above-described Steps S1340 to S1430.

With the above processes, all the sorted strings stored in the shared disks 500 are merged and the sorting process is completed. Namely, the sorted result of all the sorting target data stored in a plurality of input local disks 200 is obtained in the output local disk 400 connected to the output node 300.

As described above, in this sorting system, since the sorted strings are stored in the shared disks, it is not necessary that the input node 100 executes the merging process. Therefore a high speed sorting process can be realized by shortening the process time required for the input node. Furthermore, since the input node 100 is not required to execute the merging process, it is possible to suppress the influence of delay, hindrance and the like upon another task executable by the input node 100.

Still further, since the sorted strings are stored in the shared disks 500 and processed, it is not necessary to transfer the sorting target data and sorted strings from the input nodes to output node via the network. Therefore, even if the network cannot operate at high speed, a high speed sorting process can be realized.

(2nd Embodiment)

Figure 11:
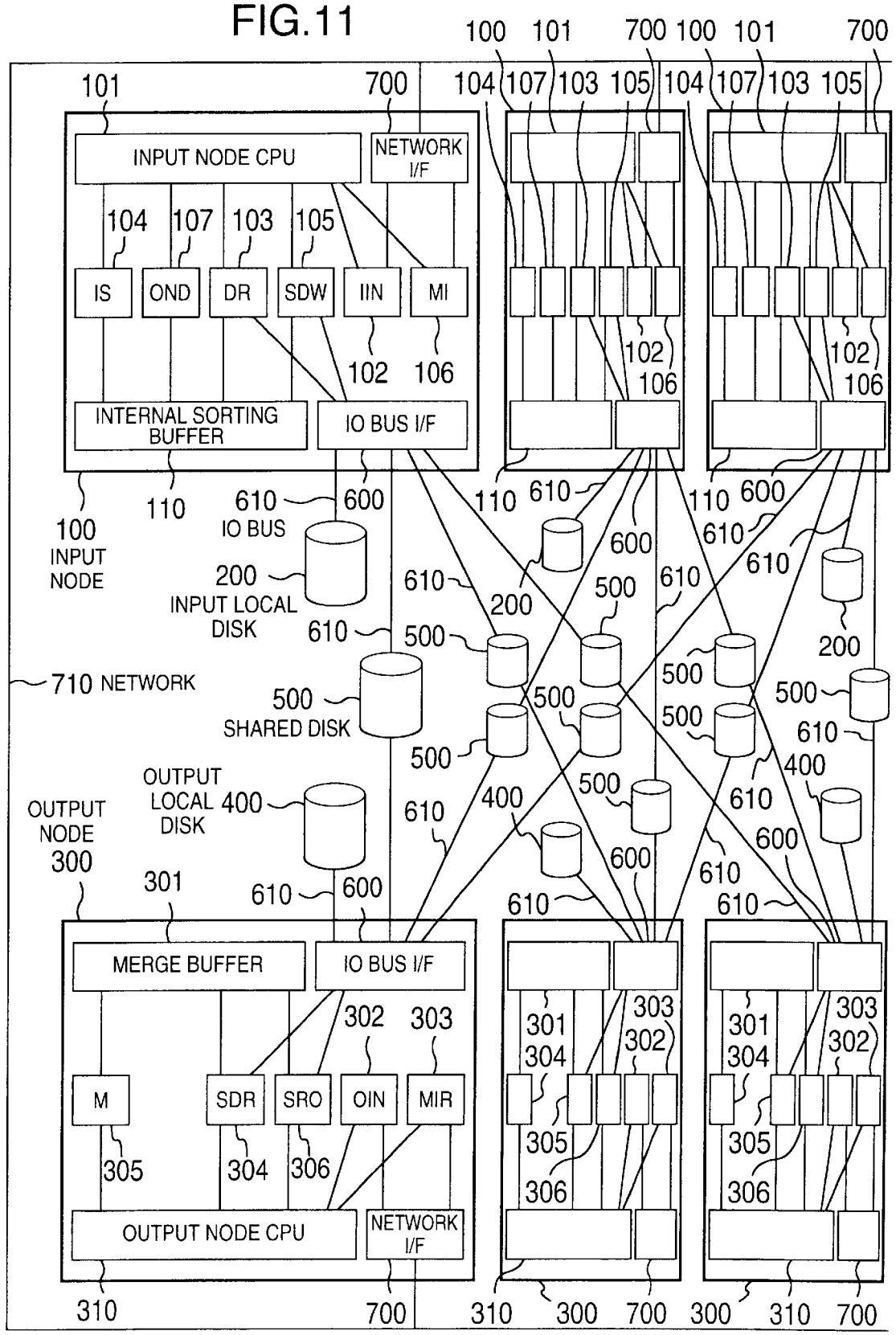
FIG. 11 is a block diagram of a second sorting system of the invention.

FIG. 11 is a block diagram of a second sorting system of the invention. Different points from the first sorting system reside in that there are a plurality of output nodes 300 (and output local disks) 400 and that each input node 200 has an output node determining unit 107. In this system, a shared disk 500 is connected via an IO bus 610 to an IO bus I/F 600 of each of the input node 100 and output node 300. One shared disk 500 is provided between each input node 600 and each output node 300. Namely, in this system, there are (i×j) shared disks 500 where i is the number of input nodes and j is the number of output nodes. Other structures are similar to the first sorting system.

In this system, a plurality of output nodes are prepared and each output node obtains the sorted result of all input data, the sorted result having been distributed in accordance with a predetermined distribution rule.

The output node determining unit 107 determines the output node 300 to which records to be internally sorted are output. The output node determining unit 107 can be realized, for example, by execution of software stored in an unrepresented memory by an input node CPU 101.

The sorting process to be executed by this sorting system will be described.

First, the management information negotiation process is executed to generate and negotiate management information necessary for the sorting process, prior to executing the actual sorting process. This process is generally similar to that described with the first sorting system, and the input information negotiation unit 102 of each input node 100 and the output information negotiation unit 302 of each output node 300 generate, negotiate and store management information necessary for the sorting process.

FIG. 12 shows an example of a system configuration table to be used by the second sorting system. As shown in FIG. 12, the system configuration table has the structure similar to that shown in FIG. 3, except that each input node has a plurality of "shared disk numbers for connection to output nodes" and a plurality of output node information pieces are provided.

After the management information necessary for the sorting process is prepared by the management information negotiation process, a sorting target data reading process is executed at each input node, in the manner similar to that of the first sorting system.

Figure 13:
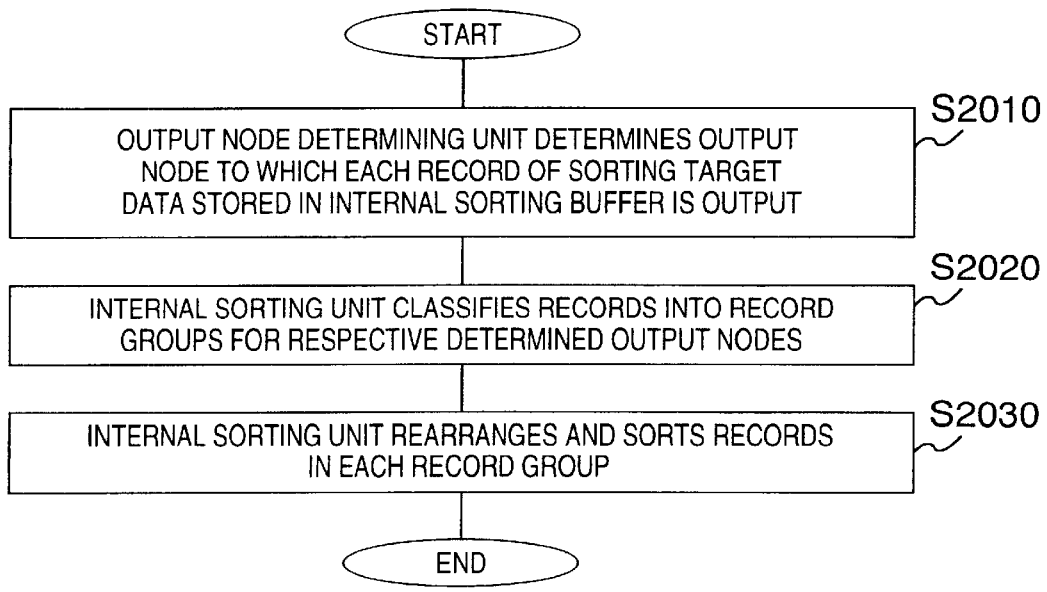
FIG. 13 is a flow chart illustrating an internal sorting process to be executed by the second sorting system.

Next, the internal sorting process to be executed by the second sorting system will be described. FIG. 13 is a flow chart illustrating the internal sorting process to be executed by the second sorting system. After the sorting target data stored in the input local disk 200 at each input node is written in the internal sorting buffer 110, the output node determining means determines the output node to which each record stored in the internal sorting buffer 110 is output, in accordance with a predetermined node decision rule using a key contained in each record or other information (S2010). The predetermined node decision rule is a distribution rule of distributing records (sorting target data) to a plurality of output nodes 300. For example, records having consecutive key values are cyclically distributed to each output node 300, a record having a specific key value is assigned to the output node 300 which is determined by substituting the specific key value into a calculation formula or by using a table with the specific value being used as a search key, or the like.

After the output node is determined for each record in the above manner, the internal sorting unit 104 classifies the records stored in the internal sorting buffer into record groups each corresponding to each of the output nodes determined by the output node determining unit 107 (S2020), and rearranges the order of records in each classified record group in accordance with a predetermined sorting rule (S2030).

With the above processes, the data stored in the internal sorting buffer 110 is classified into record groups for respective output nodes 300 determined in accordance with the predetermined decision rule, and classified record groups rearranged in accordance with the predetermined sorting rule are obtained.

Figure 14:
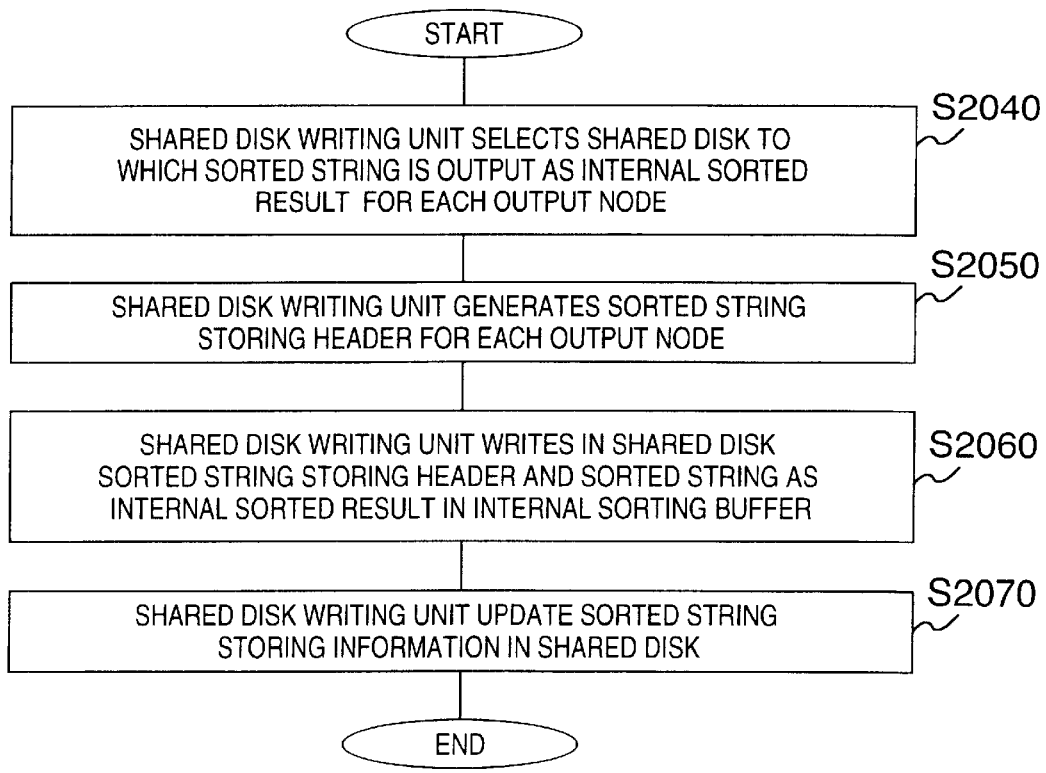
FIG. 14 is a flow chart illustrating a process of storing a sorted string to be executed by the second sorting system.

After the internal sorting process is completed in the above manner, a process of storing a sorted string in the shared disk 500 is executed. FIG. 14 is a flow chart illustrating this process of storing a sorted string in the shared disk 500. The shared disk writing unit 105 of each input node 100 selects the shared disk 500 connected to the output node 300 to which the internal sorted result stored in the internal sorting buffer 11 is output as the sorted string (S2040). Similar to that described for the first sorting system, the shared disk writing unit 105 generates a sorted string storing header for each selected shared disk 500 (S2050), and writes the header and the internally sorted string into each selected shared disk 500 (S2060) to then update the sorted string storing information in each selected shared disk 500 (S2070).

The above-described processes from reading sorting target data to storing a sorted string in the shared disk 500 are repeated by each input node 100 until all the sorting target data stored in the input local disk 200 is completely processed. After each input node 100 completely processes all the sorting target data stored in the input local disk 200 and stores the sorted strings in the shared disk 500, the merge instructing unit 106 of the input node 100 instructs via the network 710 all the output nodes 300 to execute the merging process.

Similar to that described with the first sorting system, the process of reading a sorted string from the shared disk 500 and the merge/sort result output process are executed. When each of the output nodes 300 merges all the sorted strings in a plurality of shared disks 500 connected to the output node 300 and outputs the merged result to the output local disk 400, the sorting process is completed. Of all the sorting target data stored in a plurality of input local disks 200, the sorted result distributed to a plurality of output nodes 300 in accordance with the predetermined decision rule can therefore be obtained at each output local disk 400 of the output node 300.

Also in this second sorting system, since the sorted strings are stored in the shared disks 500, it is not necessary that the input node 100 executes the merging process. Therefore a high speed sorting process can be realized by shortening the process time required for the input node. Furthermore, since the input node 100 is not required to execute the merging process, it is possible to suppress the influence of delay, hindrance and the like upon another task executable by the input node 100. Still further, it is not necessary to transfer the sorting target data and sorted strings from the input nodes to output nodes via the network. Therefore, even if the network cannot operate at high speed, a high speed sorting process can be realized.

In the above-described two embodiments, although the sorting target data is stored in the input local disk, it may be stored in other locations. For example, the input node 100 may read via the network 710 the sorting target data stored in a disk of an optional computer connected to the network, i.e., in a remote disk. Similarly, in the two embodiments, although the sorted result of sorting target data is stored in the output local disk 400, the output node 300 may output the sorted result to a remote disk via the network 710.

In the above two embodiments, the sorting target data is stored in the input local disk 200 as a file discriminated by the file name. For example, the sorting target data may be read from the input local disk 200 by the input node 100 by directly designating a logical address or physical address of the input local disk. One input node 100 may store the sorting target data as two or more files.

Also in the two embodiments, the shared disk 500 is connected to and accessed by both the input node 100 and output node 300. In this case, however, after the input node 100 completes the process of storing sorted strings in the shared disk 500 and after the input node 100 and output node 300 are synchronized upon a notice of a merge instruction, the output node 300 reads the sorted segments from the shared disk 500. Therefore, read/write operations of the shared disk 500 are not performed at the same time. It is therefore not necessarily required to perform an exclusive control between nodes connected to the shared disk. Even if the exclusive control is not performed, there is no practical problem in executing the above processes.

(3rd Embodiment)

Figure 15:
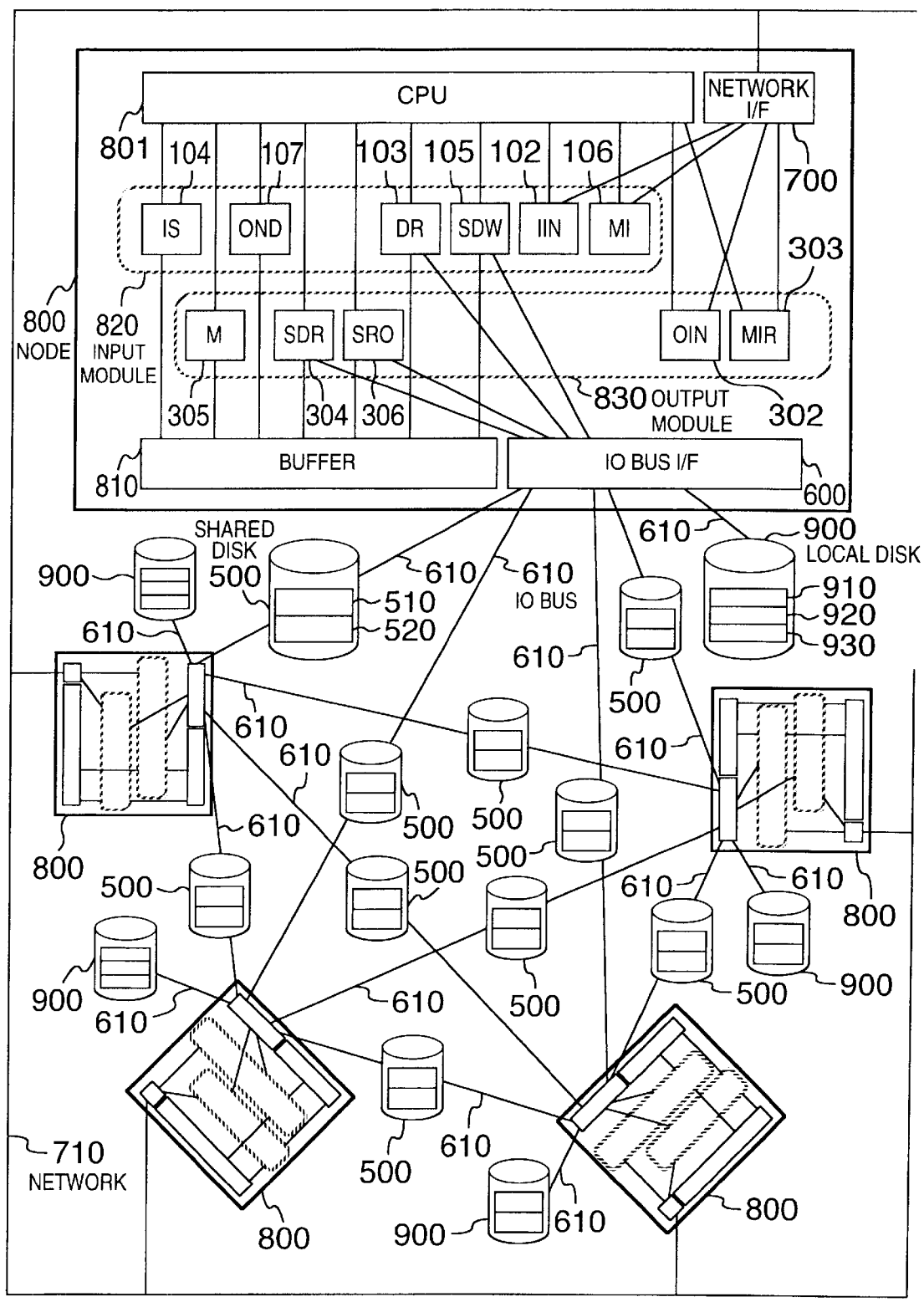
FIG. 15 is a block diagram of a third sorting system of the invention.

FIG. 15 is a block diagram of a third sorting system of the invention. This system includes nodes 800, local disks 900 and shared disks 500.

Each node 800 has a CPU 801, a buffer 810, an input module 820, an output module 830, an IO bus I/F 600 and a network interface I/F 700. The input module 820 has an input information negotiation unit 102, a data reading unit 103, an internal sorting unit 104, a shared disk writing unit 105, a merge instructing unit 106 and an output node determining unit 107.

The output module 830 has an output information negotiation unit 302, a merge instruction receiving unit 303, a shared disk reading unit 304, a merging unit 305 and a sorted result outputting unit 306. The local disk 900 is connected via an IO bus 610 to the IO bus I/F 600.

The input information negotiation unit 102, data reading unit 103, internal sorting unit 104, shared disk writing unit 105, merge instructing unit 106 and output node determining unit 107 as well as the output information negotiation unit 302, merge instruction receiving unit 303, shared disk writing unit 304, merging unit 305 and sorted result outputting unit 306 are realized, for example, by execution of software stored in an unrepresented memory by CPU 901. The buffer 810 is realized, for example, by using part of a memory which CPU 801 uses for the execution of software, or by preparing a dedicated memory.

In this system, there are a plurality of nodes 800 (hereinafter n nodes 800). The plurality of nodes 800 are connected via respective network I/F 700 to the network 710. Namely, the plurality of nodes 800 are interconnected by the network 710. Each shared disk 500 is provided between nodes 800 and connected to the IO bus I/F 600 via the IO bus 610. Each node 800 is connected to (n−1) shared disks 500. In this system, there are n×(n−1)/2 shared disks 500. The shared disk 500 has at least two storing regions AS10 and B520.

In this system, of the plurality of nodes 800, some or all of the nodes 800 (hereinafter i nodes 800, and called input nodes) store the sorting target data in their local disks 900, and some or all of the nodes 800 (hereinafter j nodes 800, and called output nodes) store some or all of the sorted result in their local disks 900, wherein i is an integer of 2 or larger or n or smaller, j is an integer of 1 or larger or n or smaller, and (i+j) is n or larger. Namely, in this system, the same node 800 may be included in both an aggregation of input nodes and an aggregation of output nodes.

Each local disk 900 of the input node has a self-node storage region 910 and a sorting target data storage region 920 for storing sorting target data. Each local disk 900 of the output node has a self-node storage region 910 and a sorting result storage region 930 for storing sorted result. Each local disk 900 of a node serving as both the input and output nodes has a self-node storage region 910, a sorting target data storage region 920 and a sorted result storage region 930.

In this system, the sorting target data is distributed and assigned to a plurality of input nodes and stored in the sorting target data storage regions 920 of the local disks 900 of the input nodes. In each input node, it is assumed that the amount of sorting target data stored in the local disk is larger than the capacity of the buffer 810 of the input node. Also in this system, the sorted result is stored in the sorted result storage region 930 of the local disk 900 of the output node.

The sorting process to be executed by this system will be described.

First, the main sorting processes to be executed by the sorting system will be described. FIG. 16 is a flow chart illustrating the main sorting processes to be executed by the sorting system. First, when the sorting system is instructed to execute a sorting process, the input module 820 and output module 830 of each node 800 generate and negotiate management information necessary for the sorting process, prior to executing the actual sorting process (S3010). For example, of the plurality of nodes 800, input nodes for storing sorting target data in the local disks and output node for storing some or all of the sorted results are discriminated.

Next, the input module 820 of each input node divides the sorting target data stored in the local disk 900 and stores the division data in the buffer 810 (S3020). The data read in the buffer 810 is internally sorted to generate a sorted result (sorted string) and the node 800 to which the sorted result is output is determined in accordance with a predetermined decision rule (if there are a plurality of output nodes) (S3030), and the sorted string is stored in the shared disk 500 connected to the determined output node 800 or stored in its local disk 900 (S3040). The input module 820 checks whether all the sorting target data stored in the local disk 900 has been processed (S3050). If there is still sorting target data not processed, the above-described Steps S3020 to S3040 are repeated. If all the sorting target data has been completely processed, the input module 820 of the input node instructs the output module 830 of the output node to execute a merging process (S3060).

If the merge instruction is received from all input modules 820 of the input nodes (S3070), the output module 830 of the output node reads a portion (sorted segment) of each of a plurality of sorted strings from i shared disks 500 and local disks 900 and writes it in the buffer 810 (S3080). The output module 800 compares the keys of records stored in the buffer 810 to obtain a whole sorted result of the records (S3090), and stores the sorted result in the local disk 900 (S3100). The output module 830 checks whether all the sorted strings have been completely processed (S3110). If there is still sorted strings not processed, the output module 830 repeats the above-described Steps S3080 to S3100. With the above-described processes executed by each node 800, the final sorted result distributed to j nodes 800 of all the sorting target data divisionally stored in i local disks 90 can be obtained in each local disk of j nodes.

The details of each process will be given in the following.

First, the management information negotiation process is executed prior to executing the actual sorting process. The input information negotiation unit 102 and output information negotiation unit 302 of each node 800 generate, negotiate and store management information necessary for the sorting process, by using information preset by a user and information exchanged between the input and output information negotiation units 102 and 302 via the network 710. The management information necessary for the sorting process includes information stored in a system configuration information table which stores data of the system configuration of the sorting system, information stored in a record information table which stores data of the sorting target records, and other information.

With this information negotiation process, the input information negotiation unit 102 and output information negotiation unit 302 assign the regions A510 and B520 of each shared disk 500 provided between the nodes 800 with one of the two data transfer directions between nodes. For example, of the two nodes 800 connected to one shared disk 500, a first node 800 writes data in the region A510 and reads data from the region B520, whereas a second node 800 writes data in the region B520 and reads data from the region A510. Namely, the region A510 of the shared disk 500 is used for the data transfer region from the first to second nodes 800 and the region B520 is used for the data transfer region from the second to first nodes 800, so that each of the two regions is stationarily assigned as a unidirectional data path.

The input and output information negotiation units 102 and 302 discriminate between input nodes for storing sorting target data in the local disks 900 and output nodes for storing sorted results in the local disks, among the plurality of nodes 800.

FIG. 17 shows an example of a system configuration table of the third sorting system. Referring to FIG. 17, a "node name" is a name assigned to each node. An "item" and "contents" at each node indicate the configuration information at each node to be used for the sorting process. For example, a "network number" in an "input node #1" is an identification number of the input node #1 in the network 710. Each item in the "input node #1" indicating the shared disk at another node, stores: an identification number of the shared node at the other node; information (e.g., region name, region size and the like, this being applied also to the following description) of the region in which the sorted string to another node is stored; and information of the region in which the sorted string from another node is stored (in example shown in FIG. 17, region A and region B). A local disk item stores: an identification number of the local disk for its own node among disks of the node #1; information of the region in which the sorted string from another node is stored; and information of the region in which the sorted string to another node is stored. Both the regions may be the same region of the local disk. A sorting target data" item stores: information of whether the sorting target data is stored in the local disk of the node (presence/absence of sorting target data); information of the storage region if the sorting target data is stored in the local disk; and the file name and record name of the sorting target data. A "possibility of storing sorted result" item stores: information of a presence/absence of a possibility of acquiring the sorted result and storing it in the local disk of the node; and information of the storage region if the sorted result is stored in the local disk.

After the management information necessary for the sorting process is prepared by the above-described management information negotiation process, a sorting target data reading process is executed. Specifically, at the input node which stores the sorting target data in the local disk 900, the data reading unit 103 reads the sorting target data from the local disk 900 and stores it in the buffer 810, by the method similar to that shown in FIG. 5.

Next, the internal sorting process will be described. As the input node stores the sorting target data in the buffer 810, similar to the method shown in FIG. 13, the output node for each record stored in the buffer 810 is determined in accordance with the predetermined node decision rule. At each determined output node, records in the internal sorting buffer are classified into record groups corresponding to determined output nodes to rearrange the records in each classified record group in accordance with the predetermined sorting rule. If only one output node is determined, records are not classified and only the internal sorting process is performed.

With the above processes, the data read into the buffer 810 is classified into record groups corresponding to the output nodes determined in accordance with the predetermined node decision rule, and records in each classified record group are rearranged in accordance with the predetermined sorting rule to obtain internally sorted results.

Next, a process of storing a sorted string in the shared disk 500 or local disk 900 will be described. This process is executed in the manner similar to that shown in FIG. 14. The shared disk writing unit 105 of the input node uses the internally sorted result in the buffer 810 of the records in each classified record group corresponding to the output node determined by the predetermined node decision rule, as the sorted result for the determined output node, and selects the region for storing the sorted string from the regions A510 and B520 of the shared disk 500 and the local disk 900. The sorted result as well as the sorted result storing header is written in the selected region to update the sorted string storing information of the regions A510 and B520 of the shared disk 500 and the self-node storage region of the local disk 900. More specifically, if the output destination is another node, the sorted string is stored in the shared disk 500, whereas if the output destination is its own node, the sorted string is stored in the self-node storage region 910 of the local disk 900. In storing the sorted string in the shared disk 500, the shared disk writing unit 105 checks which one of the regions A510 and B520 of the shared disk 500 is assigned as the data transfer path from its own node to another node, for example, by referring to the system configuration information table. Thereafter, the sorted string is stored in one of the two regions allocated as the data transfer path from its own node to another node.

The above-described processes from reading sorting target data to storing a sorted string are repeated by each input node until all the sorting target data stored in the local disk 900 is processed. After the input module 820 of the input node completely processes all the sorting target data stored in the local disk 900 and stores the sorted strings in the shared disk 500 or local disk 900, the merge instructing unit 106 instructs via the network 701 the output modules 830 of all the output nodes to execute the merging process.

Next, a process of reading a sorted string from the shared disk 500 and local disk 900 will be described. This process is executed by a method similar to that shown in FIG. 9. The merge instruction receiving unit 303 of the output module 830 receives a merge instruction from the input module 820 of the input node 100 via the network 710. Upon reception of the merge instruction from all the input nodes, the shared disk reading unit 304 reads the sorted string storing information from the i shared disks 500 and local disks 900 connected to its own node, to thereby check the total number of sorted strings stored in the shared disks 500 and local disks 900. A quotient is calculated by dividing the capacity of the buffer 810 by the total number of sorted strings. This quotient is used as the capacity of the buffer 810 to be assigned to each sorted string.

The shared disk reading unit 304 refers to the sorted string storing header of each sorted string to check the size thereof. This size is set as an initial value of the unprocessed amount of the sorted string. It is then checked whether the unprocessed amount of the sorted string is larger than the assigned buffer capacity. In accordance with this check result, a sorted segment having a proper data amount is read from the shared disk 500 and local disk 900 and written in the buffer 810. Reading the unprocessed sorted string is performed starting from the top of the sorted string to the last in the sorted order. The shared disk reading means 304 stores the sorted segments of all the sorted strings in the shared disks 500 and local disks 900, in the buffer 810.

In reading the sorted string storage information and sorted segment from the shared disk, the shared disk reading unit 304 checks which one of the regions A510 and B520 of the shared disk 500 is assigned as the data transfer path from its own node to another node, for example, by referring to the system configuration information table. Thereafter, the sorted string storage information and sorted segment are read from one of the two regions allocated as the data transfer path from its own node to another node.

Lastly, the merging and sorted result outputting process will be described. The merging and sorted result outputting process to be executed by each output node is performed by the method similar to that shown in FIG. 10. The merging unit 305 of the output node first sets a pointer to each record in the sorted segment of each sorted string stored in the buffer 810. (S1330), and compares the records designated by pointers of all the sorted segments in the buffer 810, in accordance with a predetermined sorting rule, and passes the pointer to the record at the earliest position according to the predetermined sorting rule, to the sorted result outputting unit 306. The sorted result outputting unit 306 writes the record corresponding to the received pointer in the sorted result storing region of the local disk 900. The merging unit 305 increments the pointer for the output record by "1" to indicate the next record, to thereafter repeat the record comparison and output record decision. In this manner, the merging unit 305 and sorted result outputting unit 306 output the sorted results of the sorted segments stored in the buffer 810, to the sorted result storage region 930 of the local disk 900.

If all the records contained in one sorted segment stored in the buffer 810 are output, the merging unit 305 notifies the shared disk reading unit 304 of the sorted string to which the sorted segment belongs. Upon reception of this notice, the shared disk reading unit 304 checks whether there is any unprocessed sorted segment in the sorted string. If there is an unprocessed sorted segment, this segment is read from the shared disk 500 or local disk 900 and overwritten on the already output sorted segment in the buffer 810. The merging unit 305 initialize the pointer for the newly stored sorted segment to indicate the start record in the stored sorted segment. The merging unit 305 and sorted result outputting unit 306 repeat the above-described merging process. If there is no unprocessed sorted segment in the sorted string, the shared disk reading unit 304 notifies the merging unit 305 of a sorted string process completion, so that the merging unit 305 discards the sorted segments of the sorted string so as not to be subjected to the record comparison to thereafter repeat the merging process for the remaining sorted strings.

The output node repeats the sorted string reading process and merging and sorted result outputting process until all the sorted strings stored in the shared disk 500 and local disk 900 connected to the output node are processes. With the above processes, all the sorted strings stored in the shared disk 500 and local disk 900 connected to each output node are merged and the sorting process for all the sorting target data stored in the sorting target data storage region 920 of the local disk 900 of the input node is completed. The sorted result distributed to each output node is therefore obtained in the sorted result storage region 930 of each local disk 900 connected to the output node.

Also in this sorting system, similar to the first and second sorting systems, since the sorted strings are stored in the shared disks 500, it is not necessary that the input node executes the merging process. Therefore a high speed sorting process can be realized by shortening the process time required for the input node. Furthermore, it is possible to suppress the influence of delay, hindrance and the like upon another task executable by the input node. Still further, since it is not necessary to transfer the sorting target data and sorted strings from the input nodes which execute the internal sorting process to output nodes via the network, even if the network cannot operate at high speed, a high speed sorting process can be realized.

In this sorting system, although the sorting target data is stored in the sorting target data storage region 920 of the local disk 900, it may be stored in other locations. For example, the input node may read via the network 710 the sorting target data stored in a remote disk. Similarly, the output node may output the sorted result to a remote disk via the network 710.

Also in this system, the local disk 900 has the self-node storage region 910, sorting target data storage region 920, sorted result storage region 930 and the like. Instead, for example, each node 800 may have a plurality of local disks 900 each separately having the self-node storage region 910, sorting target data storage region 920 and sorted result storage region 930. Further, although each shared disk 500 has two regions A510 and B520, for example two shared disks 500 may be provided between a pair of nodes 800 and each of the two shared disks 500 may be stationarily assigned a unidirectional data path in a tow-way data path.

Also in this system, the sorting target data is stored in the sorting target data storage region 920 of each local disk 900 as one file identified by the file name. Instead, for example, the sorting target data may be read by the node 800 from the local disk 900, by directly designating a logical or physical address on the local disk 900. A single node 800 may store two or more files of the sorting target data.

Also in this system, each shared disk 500 is connected to and accessed by two nodes 800. In this case, however, the regions A510 and B520 are each stationarily assigned a unidirectional data transfer path in a two-way data path between two nodes 800 connected to the shared disk 500. Therefore, the input module 820 of the input node stores (writes) a sorted string in one of the two regions of the shared disk 500. After synchronization between the input module 820 of an input node and the output module 830 of an output node upon a merge instruction, the output module 830 of the output node reads a sorted segment from the region of the shared disk 500 so that both the read/write operations of the region are not performed at the same time. It is therefore not necessarily required to perform an exclusive control between nodes connected to the shared disk. Even if the exclusive control is not performed, there is no practical problem in executing the above processes.

In the reading, internal sorting and sorted string storing process for sorting target data, the input module 820 of each node 800 uses the buffer 810, and in the sorted string reading and merging and sorted result outputting process, the output module 830 of each node 800 uses the buffer 810. However, the reading, internal sorting and sorted string storing process and the sorted string reading and merging and sorted result outputting process, are time sequentially separated at each node 800 by synchronization of the input and output modules 820 and 830 upon reception of a merge instruction notice. Therefore, the buffer 810 at each node 800 is not used by the input and output modules 820 and 830 at the same time. The buffer 810 can therefore be shared by both the input and output modules 820 and 830 without preparing different buffer regions for the input and output modules 820 and 830.

In the embodiments described above, the data amount of sorting target data, sorted strings, sorted segments and the like to be processed uses the unit of record. This record unit is used for storing the sorting target data in the internal sorting buffer 110 and buffer 810, reading the sorted string from the shared disk 500 and local disk 900, and storing the sorted segment in the merge buffer 310 and buffer 810.

In each of the embodiments described above, although a plurality of disks are used, a plurality of physical or logical disks constituting a disk array with a plurality of interfaces may also be used as the disks of the embodiment. A disk array manages a plurality of disks operating in parallel and constitutes a disk subsystem. By using the disk array, management of disks becomes easy and a higher speed system can be realized.

The sorting process, sorting method and system of each embodiment described above are applicable to generation and update (load) of databases of a database system. In many cases of the generation and update of databases, original data of databases is sorted and processed. If the amount of original data is large, it takes a long time to sort and load the original data so that it takes a long time until the database system can be made usable and user convenience is degraded considerably. By applying the sorting process, sorting method and system to the load process, it becomes possible to shorten the sorting time and loading time and considerably improve a time efficiency and user availability of the database system. The sorting process, sorting method and system are suitable for use with a large scale database dealing with a large amount of data, such as data ware house, OLAP (Online Analytical Processing) and decision support system or with a parallel database system processing data in parallel by using a plurality of nodes.

As described so far, according to the present invention, it is possible to shorten the time required for a merging process when a plurality of computers of a computer system executes the merging process. The sorting process can therefore be executed at high speed. Furthermore, it is possible to suppress the influence of delay, hindrance and the like upon another task executable by the computer system.

Still further, it is possible to shorten the data transfer time of a network and a process time for the sorting process and realize the sorting process capable of being executed at high speed.

What is claimed is:

1. A sorting system having a plurality of nodes connected to each other by a data transferring path, comprising:
   a plurality of input nodes;
   a plurality of output nodes; and
   a shared external storage unit connected between each of said input nodes and each of said output nodes, wherein:
      each of said input nodes comprises:
         a first buffer;
         means for storing sorting target data in said first buffer;
         means for internally sorting data in said first buffer in accordance with a predetermined sorting rule;
         means for classifying data in accordance with data having a specific key value in said first buffer and a distribution rule for distributing the data to a selected one of said output nodes;
         means for distributing and storing said classified data as a sorted string to be processed on each of said plurality of output nodes onto each storage area of said shared external storage unit, each of said areas corresponding to each of said plurality of output nodes; and
         means for storing as a sorted string an internally sorted result in said shared external storage unit, in accordance with the distribution rule; and
      each of said output nodes comprises:
         a second buffer;
         means for storing in said second buffer the sorted string stored in said shared external storage unit;
         means for merging a plurality of sorted strings stored in said second buffer, in accordance with the predetermined sorting rule; and
         means for outputting a merged result as a sorted result.

2. A sorting system having a plurality of nodes connected to each other by a data transferring path, comprising:
   a plurality of nodes;
   a dedicated external storage unit provided for each of said plurality of nodes; and
   a shared external storage unit provided between each pair of nodes of said plurality of nodes, wherein:
      at least one node among said plurality of nodes comprises:
         a first buffer;
         means for storing sorting target data in said first buffer;
         means for internally sorting data in said first buffer in accordance with a predetermined sorting rule;
         means for classifying data in accordance with data having a specific key value in said first buffer and a distribution rule for distributing the data to a selected one of said plurality of nodes different from said node classifying the data;
         means for distributing and storing said classified data as a sorted string to be processed on each of said plurality of nodes onto each storage area of said dedicated or shared external storage unit, each of said areas corresponding to each of said plurality of nodes;
         means for sorting as a sorted string an internally sorted result in said dedicated external storage unit, in accordance with the distribution rule;
         a second buffer;
         means for storing in said second buffer the sorted string stored in said shared external storage unit and said dedicated external storage unit;
         means for merging a plurality of sorted strings stored in said second buffer, in accordance with the predetermined sorting rule; and
         means for outputting a merged result as a sorted result.

3. A sorting method for a sorting system having a plurality of input nodes, a plurality of output nodes, and a shared external storage unit connected between each of the input nodes and each of the output nodes, the method comprising the steps of:
   storing sorting target data in each of the input nodes;

classifying and internally sorting the read sorting target data in accordance with data having a specific key value and a distribution rule for distributing the data to a selected one of said output nodes;

distributing and storing said classified data as a sorted string to be processed on each of said plurality of output nodes onto each storage area of said shared external storage unit, each of said areas corresponding to each of said plurality of output nodes;

performing a process from said storing step to said distributing and storing step for all sorting target data; and thereafter reading the sorted string from the shared external storage units shared with the input nodes, storing the sorted string in each output node, and merging the sorted string in accordance with the predetermined sorting rule.

4. A sorting method for a sorting system having a plurality of nodes, a dedicated external storage unit provided for each of the plurality of nodes, and a shared external storage unit provided between each pair of nodes of the plurality of nodes, the method comprising the steps of:

storing sorting target data in at least one of the plurality of nodes;

classifying and internally sorting the read sorting target data in accordance with data having a specific key value and a distribution rule for distributing the data to a selected one of said nodes different from said node classifying and internally sorting the read sorting target data;

distributing and storing said classified data as a sorted string to be processed on each of said plurality of nodes onto each storage area of said dedicated or shared external storage unit, each of said areas corresponding to each of said plurality of nodes;

performing a process from said storing step to said distributing and storing step for all sorting target data; and thereafter reading each sorted string from the dedicated and shared external storage units at one of the plurality of nodes and merging each sorted string in accordance with the predetermined sorting rule.

* * * * *